Nov. 1, 1955  S. T. CARTER  2,722,332
MACHINE FOR APPLYING THERMOPLASTICALLY COATED LABELS
Filed March 25, 1953   7 Sheets-Sheet 1

Inventor
Sidney T. Carter
by Roberts Cushman & Grover
Att'ys.

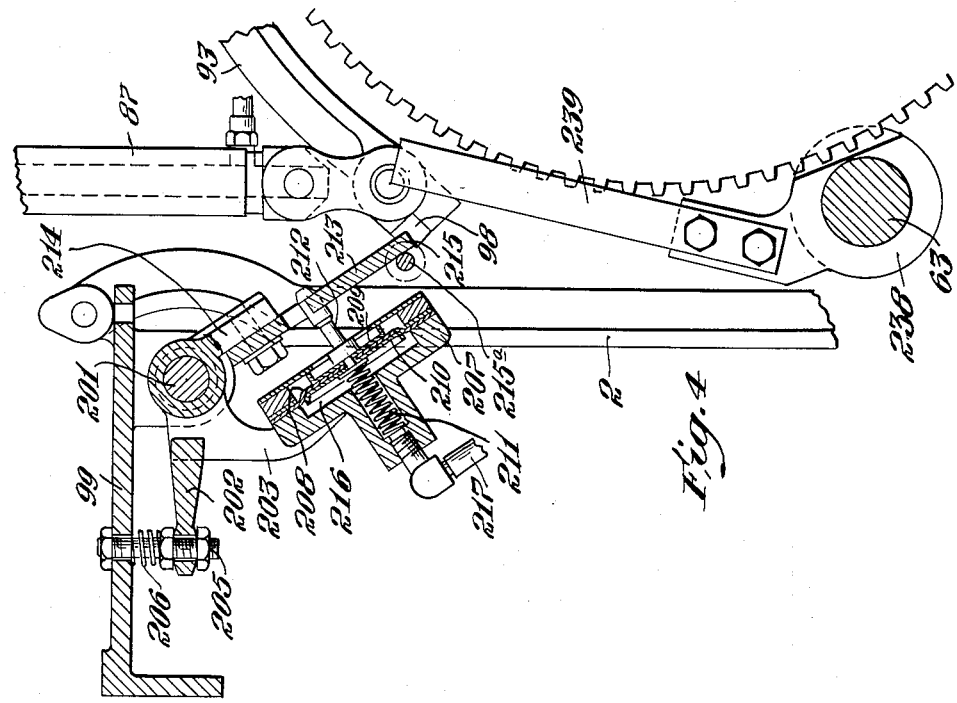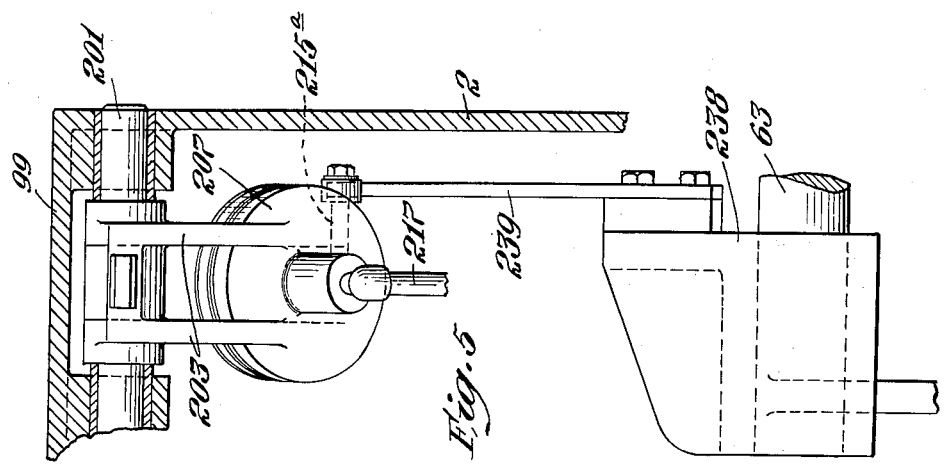

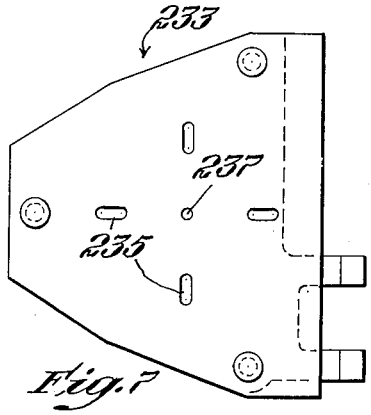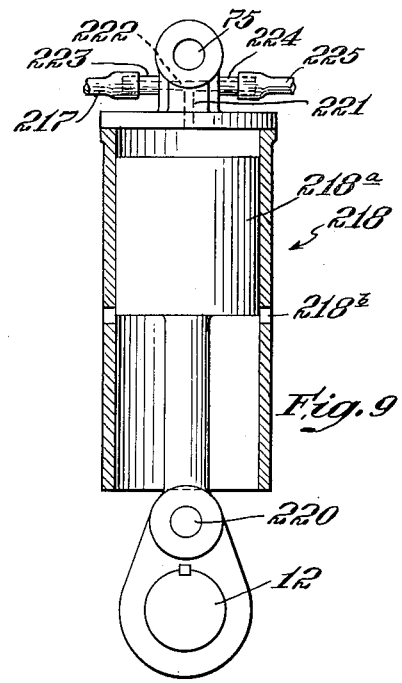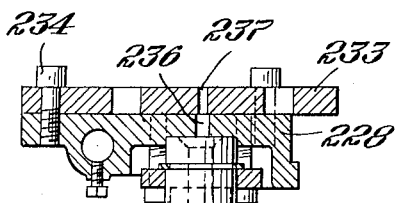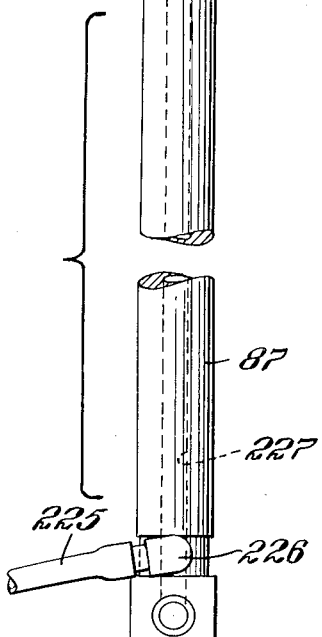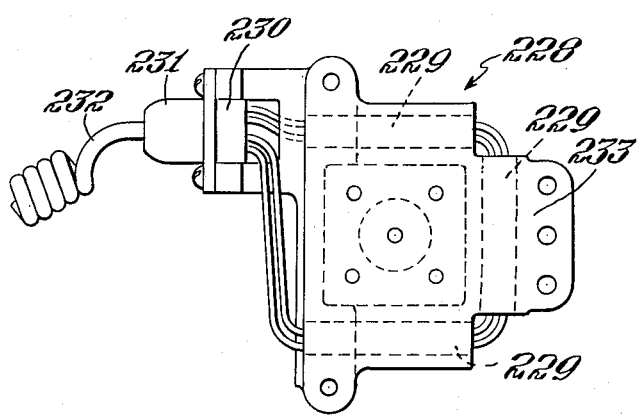

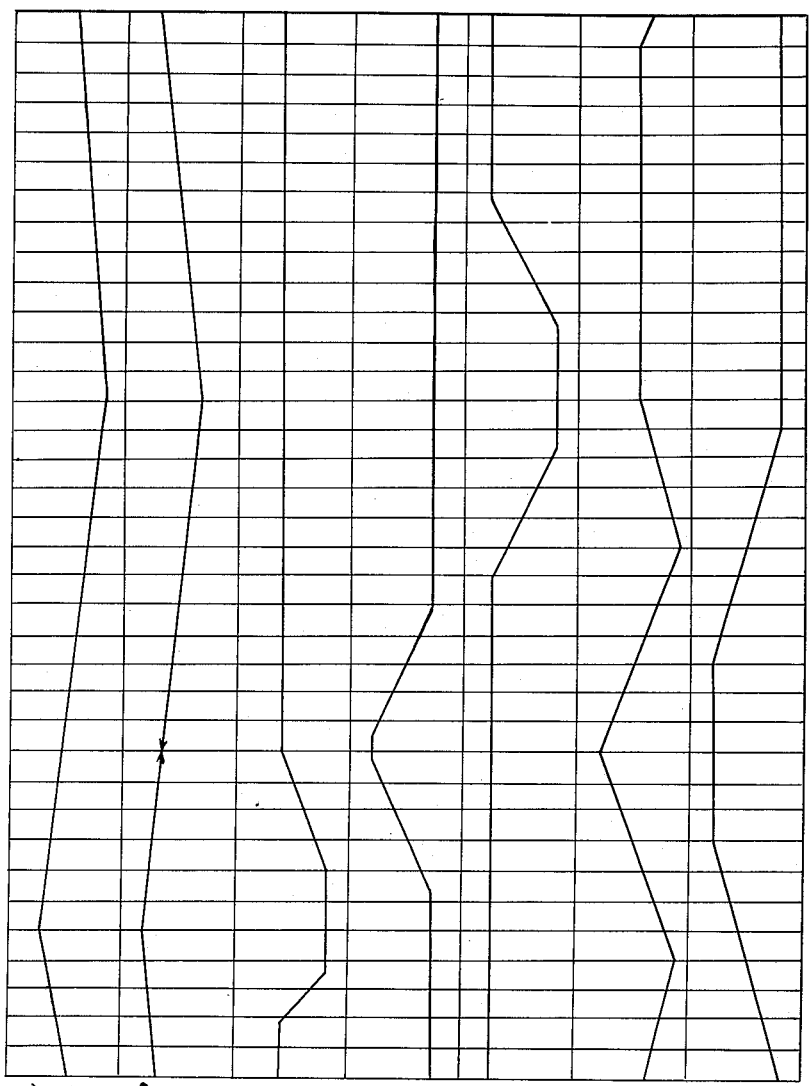

United States Patent Office 2,722,332
Patented Nov. 1, 1955

2,722,332

**MACHINE FOR APPLYING THERMOPLASTI-
CALLY COATED LABELS**

Sidney T. Carter, Shrewsbury, Mass., assignor to Geo. J.
Meyer Manufacturing Co., Cudahy, Wis., a corporation of Wisconsin Application March 25, 1953, Serial No. 344,523

24 Claims. (Cl. 216—54)

This invention pertains to labeling machines and more especially to labeling machines designed to employ thermoplastically coated labels. For convenience in illustration, but without intent thereby to limit the invention to such use, it is here specifically illustrated and described as embodied in a semi-automatic machine of the general type disclosed in the patent to Carter No. 2,600,205 dated June 10, 1952. In the operation of the patented machine, uncoated labels are taken from a magazine by a gum-coated picker from which they are transferred to a pneumatic transfer carriage and moved by the latter to the label-applying station. In the machine of the present invention the labels are also taken from a magazine by a picker from which they are transferred to a pneumatic type carriage and by the latter carried to the label-applying station, but the present invention provides for the withdrawal from the magazine of labels precoated with a normally nontacky but thermoplastic adhesive by the use of a heated picker whose contact with the coating on the label causes the coating to become tacky and adhesive.

As machines of the kind above referred to are often operated at a speed of the order of 60 cycles per minute, the time interval during which the heated picker may contact the last label in the magazine is very short, although in machines as heretofore devised, it has been considered necessary, even though the picker were heated to a temperature of 260° F. or thereabouts, to cause the picker to dwell for an appreciable time in contact with the label in order to reduce the coating to the desired tacky condition. However, when the picker, heated to such a temperature, remains in contact with the endmost label for even a very short time, there is a tendency for the heat to be transmitted from one label to another, so that several labels may stick together and thus be picked at the same time. Various suggestions have been made for overcoming this tendency but heretofore none of these has been found satisfactory, either from functional failure or because they necessitate the use of expensive and complicated instrumentalities. Among such prior suggestions has been that of forcing cold air between the labels at the lower part of the magazine in order to prevent them from being heated to the tacky point, or the use of a picker of the pneumatic type which is unduly slow in action.

In accordance with the present invention, the picker is so designed and actuated that when it arrives at the picking position it is already sticky, like the usual gum-coated picker, so that mere contact of the picker with the label is sufficient to withdraw the label from the magazine without any appreciable dwell of the picker in the picking position. However, no gum box or similar device is employed. In order to obtain this effect the picker is given a thin coating of adhesive prior to the beginning of the first cycle of operations so that it picks off the first thermoplastically-coated label from the magazine like the usual gum-coated picker. While this label is in transit to the transfer station, the thermoplastic coating on the label becomes tacky by reason of its relatively long contact with the heated picker; at the transfer station the label is so removed from the picker as to leave a little of its coating on the picker; this residue which remains on the picker is kept tacky by the heat of the picker and suffices to pick the next label by adhesion, and so on seriatim. Thus, since the picker need not dwell in contact with the lowermost label in the magazine there is no danger that labels adjacent to the endmost label will be overheated and thus the former difficulty in the employment of thermoplastic labels is avoided. Thus the principal object of the invention, that is to say the provision of a machine capable of picking thermoplastically coated labels at high speed from the magazine, one at a time, has been attained. A further object of the invention is to provide improved means whereby the label, adherent to the picker by its thermoplastic coating, may be separated properly from the picker at the transfer station. A further object is to provide means whereby, upon failure of the picker to take a label from a magazine, the picker will be prevented from contacting the transfer pad, which might be damaged by direct contact with the hot picker, during the relatively long period in which the picker and transfer carriage are in cooperative association. Other and further objects and advantages of the invention will be pointed out in the following more detailed description and by reference to the accompanying drawings wherein Fig. 1 is a fragmentary, diagrammatic elevation, partly in vertical section, showing the more essential parts of the machine, including the magazine, the picker and the transfer carriage, the parts being shown in the normal positions of operation;

Fig. 4 is a diagrammatic vertical section, with parts in elevation and others omitted, to larger scale than Fig. 1, illustrating the pneumatic control for the picker latch;

Fig. 5 is a fragmentary, rear elevation of the parts shown in Fig. 4;

Fig. 6 is a fragmentary, vertical section, to large scale, showing the picker actuating post and the picker heating means carried thereby;

Fig. 7 is a plan view of the parts shown in Fig. 6;

Fig. 8 is a plan view of the picker heating device with the picker removed;

Fig. 9 is a side elevation, with parts in vertical section, illustrating a pump forming an element of the pneumatic control system;

Fig. 11 is a diagrammatic illustration of the cycle of operation of the several essential parts of the machine.

Figure 1:
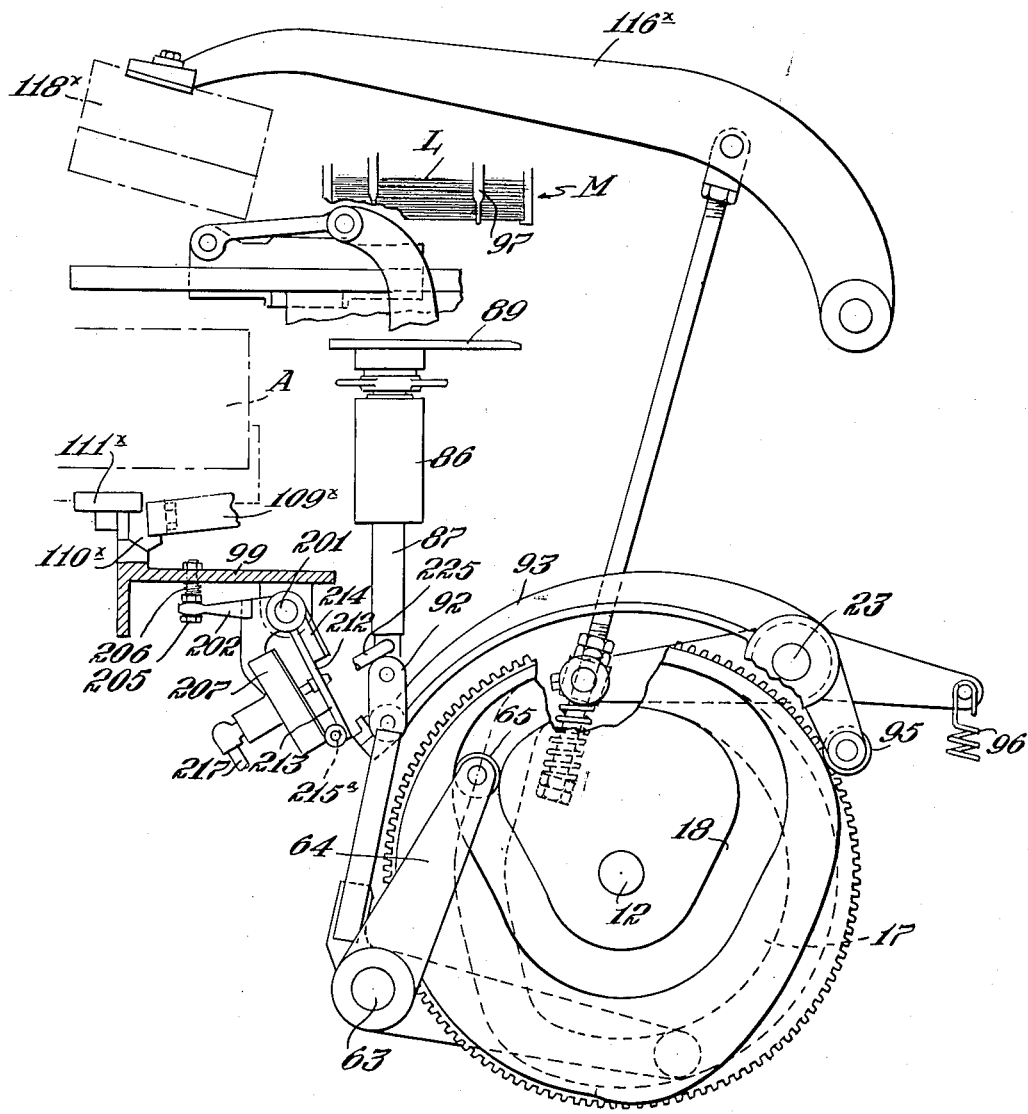
Figure 2:
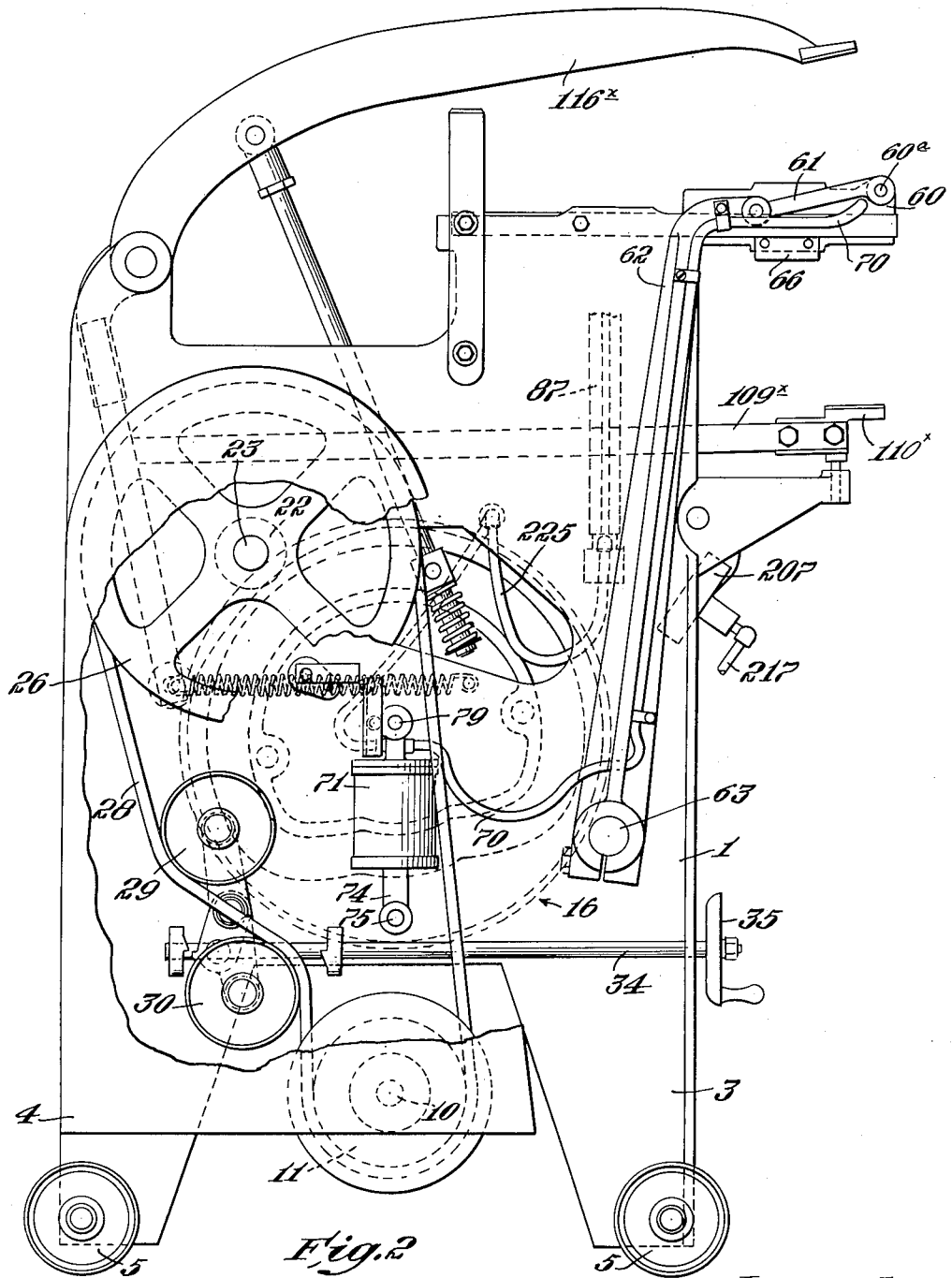
Fig. 2 is a fragmentary, diagrammatic side elevation, to larger scale than Fig. 1, and looking from the opposite side of the machine and in particular illustrating some of the pneumatic connections.
Figure 3:
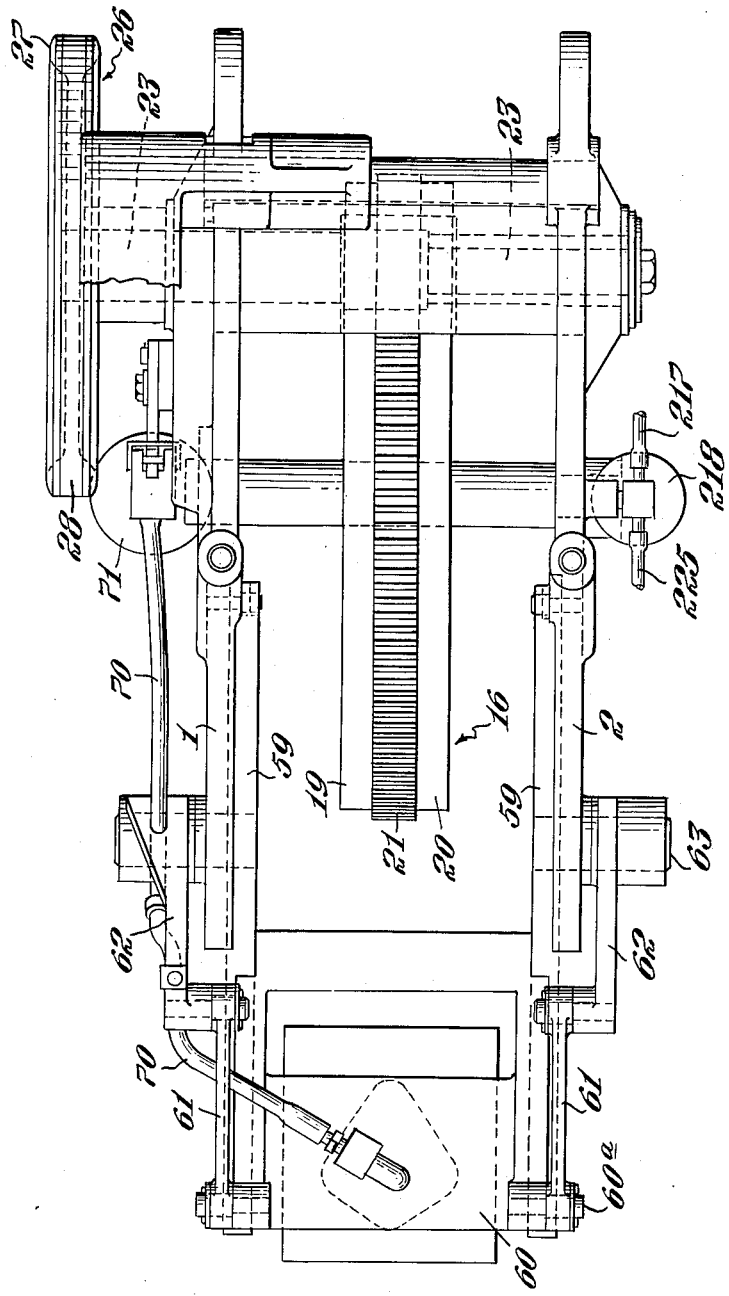
Fig. 3 is a plan view of the machine with certain parts omitted.
Figure 10:
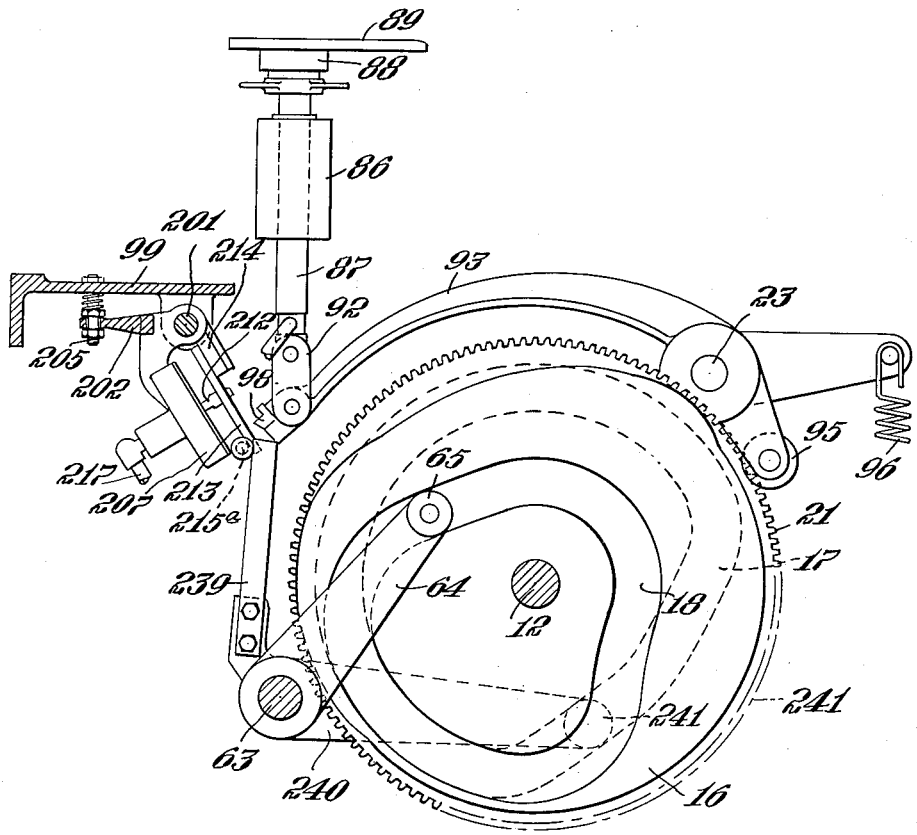
Fig. 10 is a view similar to Fig. 1, but showing the picker latching mechanism in position to prevent the picker from rising to picking position.

As above noted the invention is here described by way of example as embodied in a machine of the general type more fully illustrated in the patent to Carter 2,600,205 to which reference may be had for disclosure of elements not here specifically described, similar characters being here employed to designate parts corresponding to those of the patented machine. Thus referring to Figs. 2 and 3, the machine is shown as comprising the upright side frame members 1 and 2, which would usually be castings, the lower portions of these frame members diverging from each other to provide legs 3 and 4. As indicated in Fig. 2 the legs are provided with wheels 5 to facilitate the movement of the machine from place to place. Within the lower part of the frame there is arranged a drive motor having a horizontal shaft 10 (Fig. 2) to which is fixed the grooved pulley 11. Above the shaft 10 there is arranged a horizontal cam shaft 12 (Fig. 3) parallel to the shaft 10 and which turns in bearings carried by the frame members 1 and 2 and to this shaft there is fixed a cam disk 16 (Figs. 1, 2, 3 and 10) having in its left-hand face a cam groove 17; another cam groove 18 in its right-hand face; left and right edge cams 19 and 20 (Fig. 3) on its peripheral edge, and, intervening between these latter cams 19 and 20, an annular gear having teeth 21. The teeth of this gear mesh with a pinion 22 (Fig. 2) on a shaft 23 parallel to the shaft 12. The end of this shaft projects outwardly beyond the frame member 1 (Fig. 3) and carries a pulley 26 whose rim is furnished with a V groove for the reception of a drive belt 28 (Figs. 2 and 3) which also passes around the pulley 11 on the motor shaft. Preferably the grooved rim 27 (Fig. 3) of the pulley 26 is shaped to constitute a hand wheel by means of which the machine may be turned slowly by hand, if desired. The belt 28 contacts tensioning pulleys 29 and 30 which are so mounted that, by the actuation of a shaft 34, by means of a hand wheel 35, the belt 28 may be tensioned more or less. Desirably, the pulley 11 is of that type whereby a change in the effective diameter of the pulley may be obtained by varying the tightness of the belt.

At the upper forward part of the frame, horizontally fixed and parallel guide rails 59 (Fig. 3) are arranged, one of these rails being secured to each of the frame members 1 and 2, respectively. These guide rails define a path for the label transfer carriage 60 which slides from front to rear along these rails. A pin 60$^a$ (Fig. 2) projects from each side of this carriage 60 and to each pin is pivotally connected the forward end of a link 61, the rear ends of these links being pivotally secured to the upper ends of long upright rock arms 62, one at each side of the machine. The lower ends of these rock arms 62 are fixed to a transverse shaft 63 which turns in bearings in the frame members 1 and 2. An actuating arm 64 (Fig. 1) is fixed to the shaft 63 and at its upper end carries a cam follower roll 65 which engages the cam groove 18 in the right-hand side of the cam disk 16. This cam is of such contour as to cause the transfer carriage 60 to move backwardly and forwardly along the rails 59 in proper timed relation to the other parts of the machine.

The label-transfer carriage 60 supports a pneumatic pickup plate or pad 66 (Fig. 2) provided with a plurality of suction orifices which communicate with a chamber within the body of the transfer carriage. This chamber communicates, by means of a flexible conduit 70 (Fig. 2) which is attached to the left-hand actuating arm 62, with an air pump 71 mounted at the left-hand side of the machine. This air pump may be of the kind more specifically described in the above-named patent to Carter and is designed at the proper times to create suction within the chamber of the transfer carriage and thus to cause a label to adhere to the underside of the suction pad by vacuum action.

A fixed vertical bearing 86 (Figs. 1 and 10) arranged midway between the frame members 1 and 2 provides a guideway for the vertically sliding stem 87 which supports the picker. The lower end of the stem 87 is pivotally connected to the upper end of a link 92 whose lower end is pivoted to the forward end of a curved picker-actuating lever 93 having a hub portion which turns on a shaft 23. The lever 93 has a downwardly extending arm on which is mounted a cam follower roll 93 which bears against the edge cam 20 of the cam disk 16. A spring 96 tends to swing the arm 93 in a clockwise direction and thus to move the picker upwardly toward the magazine M (Fig. 1) which is arranged directly above the picker and in which labels L are held in the usual manner by the fingers 97.

The forward end of the arm 93 (that is to say the left-hand end as viewed in Fig. 1) is provided with a notch 98 designed to cooperate with automatic controlling means for preventing the picker from rising to the transfer level under some conditions of operation as hereafter described. This picker-controlling means comprises parts which are supported by a rearwardly projecting horizontal shelf 99 (Fig. 1) forming a portion of the machine frame and which carries spaced bearings for a shaft 201 which carries a bell crank lever comprising the arms 202 and 203 (Fig. 4). The arm 202 underlies the shelf 99 and has fixed to it a pin 205 of adjustable effective length which extends up through a hole in the shelf 99. A coiled compression spring 206 between the shelf and arm embraces the pin 205 and tends to swing the arm 202 downwardly, that is to say in a counterclockwise direction.

Mounted on the arm 203 is the housing or casing 207 of a pneumatic motor. This motor, as here shown, is of the diaphragm type, comprising the pressure sensitive diaphragm 208 (Fig. 4) whose central portion bears at its outer face against a movable rigid head 209 and at its inner face against a movable rigid plate 210 which is urged outwardly by a spring 211 located within the housing of the motor. The movable head 209 has fixed to its center a rigid, outwardly projecting actuating hook 212 which engages a latch 213 fixed to an arm 214 having a hub which swings freely on the shaft 201. The free lower end of latch 213 is designed, at times, to enter the notch 98 at the free end of the picker-actuating lever 93 so as to limit upward movement of said lever. A pin 215$^a$ projects horizontally from the lower part of the latch 213 and carries a freely turning roll 215.

The interior chamber 216 of the pneumatic motor is connected by a flexible conduit 217 to a second air pump 218, arranged at the opposite side of the machine from the pump 71. This pump 218 (Fig. 9) may be generally similar to the pump 71, being pivoted to rock about a stationary pivot pin 75 and being actuated by a crank pin 220 at the opposite end of the shaft 12 from the pin 79. However, whereas the pump 71 which provides suction at the transfer pad is provided with a valve at its head end, as more fully described in the Carter patent, the pump 18 has no valve in its head end, but, at this end, has a boss (Fig. 9) provided with a T-shaped passage, the stem portion 221 of which always communicates with the interior of the pump cylinder while the transverse portion 222 of the passage extends into nipples 223 and 224 designed to receive the ends of flexible conduits, one of which is the conduit 217 above described which leads into the housing 207 of the pressure motor. The pump 218 has a piston 218$^a$ which, at certain times in its cycle of operation, covers or uncovers a port 218$^b$ in the wall of the pump cylinder. A flexible conduit 225, which is connected to the nipple 223, leads to a fitting 226 (Fig. 6) which is attached to the lower portion of the picker stem 87. In the present device the stem 87 has an axial bore 227 and the fitting 226 which connects the conduit 225 to the stem is so designed that the conduit always communicates with the bore 227. To the upper end of the stem 87 a heater housing 228 is removably secured. As here illustrated (Figs. 6 and 8) this housing has a flat horizontal upper surface on which the picker plate 233 rests, and has within it chambers (three are shown) for the reception of electrical heating units 229 whose terminals are connected to a socket 230 fixed within the housing and which is designed to receive a conventional plug 231 at the end of a flexible conducting cord 232 leading from a suitable source of electrical current.

The picker plate 233 (Figs. 6 and 7) is of appropriate size to coact with the label which is to be applied and is removably attached (Fig. 6) in direct contact, to the upper face of the heater housing 228, for example by screws 234 or the like. As shown in Fig. 7, the picker plate has slots 235 to receive the lower ends of the label-retaining fingers 97 of the magazine.

The heater housing 228 has a central passage 236 and the picker plate 233 has a central passage 237, the passages 236 and 237 being axially aligned with the bore 227 in the picker stem 87. Thus there is a free conduit for the flow of air from the pump 218 to and through the center of the picker plate.

The hub 238 (Fig. 4) of a lever arm 239 is mounted on the shaft 63 and has an arm 240 provided with a cam follower roll 241 (Fig. 10) which engages the cam groove 17 in the disk 16, this being the same cam groove which, by means of connections more fully described in the Carter patent actuates the label presser or wiper 118$^x$ (Fig. 1) which is carried by the lever arm 116$^x$. The arm 239 swings in a path such, that at times, it engages the roll 215 on the pin 215$^a$ which projects from the latch 213.

The article A (Fig. 1) which is to be labeled is placed in the cradle 111$^x$ which is carried by a bracket 110$^x$ mounted on the forward end of a lever arm 109$^x$ which is actuated by the edge cam 19 on the cam disk 16, as more fully described in the Carter patent.

Fig. 11 is a timing chart illustrative of the sequence of operations of the machine in applying a label and this chart will be referred to in describing the operation.

It will be assumed that the heating units 229 in the picker-supporting housing 228 have been energized and that labels L (having normally non-tacky thermoplastic coatings on their lower sides) have been placed in the magazine M. It should further be understood that at the beginning of the operation, adhesive will be applied by hand to the picker, for example, by the use of a brush or by wiping the coating of a label over the hot surface of the picker so that some of the coating of the label will be left in tacky condition on the picker.

For convenience in description it is desirable to consider the machine as having commenced its first cycle and that the cam shaft 12 has turned from a zero position, representing the beginning of a cycle, through an arc of 220°. At this point (Fig. 11) the picker in rising from its lowest position after having previously taken a label from the magazine, and at 230° reaches the transfer level with the label resting on the upper surface of the picker. Between the points 230° and 350°, that is through an arc of 120°, the picker remains at this level. During this dwell of 120°, the hot picker is holding the label in contact with the pneumatic transfer pad 66, the latter also dwelling in transfer position from 220° to 360°. At 230° the pump 71 begins to create suction at the transfer pad and this suction is maintained until the shaft 12 has completed the first cycle and has reached 50° on its next cycle. The pad thus grips the label held against it by the picker. As the cam shaft completes its first cycle (from 350° to 360°) the picker begins to move directly down, that is to say in a direction perpendicular to the horizontal, under surface of the transfer pad. As the transfer pad is still at transfer station between 350° and 360°, this results in exerting a tearing stress on the now tacky coating on the label so that some of the coating remains adherent to the picker while the label with the major portion of the coating is held by suction to the transfer pad. In order to insure this direct separation of the label from the picker the pump shown in Fig. 9 is utilized. This pump begins to build up pressure in the bore 227 in the picker stem at the time when the picker first contacts the label with the transfer pad (230°) and when the picker begins to move downwardly at 250°, thus relieving the mechanical pressure between the picker and transfer pad, the air pressure, acting through the passages 236 and 237 tends to blast the label away from the picker thus assisting in the pulling of the label away from the picker by the transfer pad. The air continues to discharge from the passage 237 after the label has been taken from the pad until the shaft has reached 50° on the next cycle, this movement of air being desirable as a means for lowering the temperature of the picker in preparation of the picking of the next label. From 40° of the second cycle the picker begins to rise and continues to rise until at 110° it contacts the lower surface of the lowermost label in the magazine. Since the picker already has a tacky coating of adhesive (abstracted from the previous label) it is capable of acting in the same way as the commonly used glue-coated picker so as to take the lowermost label from the magazine without waiting for the coating on said label to be heated so as to become tacky. Thus, as shown at the 110° point, the picker immediately starts down, with no appreciable dwell after contacting the label, so that heat from the picker does not activate the coating of any labels within the magazine. Between the points 110 and 180° of the cycle, the picker moves down, carrying the label with it, and during this time and while the picker is moving upward to the transfer level at 230°, the heat of the picker is effective to activate the coating on the label so that even before the label is engaged by the transfer pad its coating has become as tacky as is required.

During each cycle of operation the cam 17, acting on the arm 240 (Fig. 10) swings the lever 239 into contact with the roller on latch-actuating pin 215$^a$, thus swinging the latch 213 so that it will not engage the notch 98 in the end of the picker-actuating arm 93, thus allowing the picker to rise. The cam 17 is so designed that the latch is thus held out of action between approximately 35° and 70° of the cycle (Fig. 11), that is during the first portion of the upward motion of the picker toward the magazine. In the normal operation, at the point 50° (just after the picker begins to rise) the pump 218 starts on its suction-creating stroke, but no actual suction can be created until a label covers the end of the passage 237 in the picker which, in the normal intended operation, occurs at 110°. Thereafter, and assuming a label does cover the passage 237, and until 230°, the pump 218 creates suction in the conduit 217, thereby causing the diaphragm 218 of the pneumatic motor to draw the hook 212 inwardly, thus continuing to hold the lower end of the latch 213 out of the path of the lower end of the picker-actuating arm 93, and so permitting the picker to rise to the transfer level.

However, if when the picker rises, at the point 110°, at which it is supposed to take a label, it fails to receive a label, the port 237 remains open. No suction is created in the conduit 217; the pneumatic motor is not actuated to retract the hook 212; the spring 211 moves latch 213, out to the position shown in Fig. 4 so that its end is in the path of the free end of the lever 93 and the picker is thus prevented from rising to the transfer level.

By the provision of this picker-restraining means, the hot picker is prevented from coming into direct contact with the pneumatic pad, as it would otherwise do in the absence of a label on the picker. Such contact of the hot picker with the pneumatic pad, which is usually of resilient material, would quickly cause deterioration of the pad and necessitate frequent renewal.

The relative timing of the operations of the other parts of the machine is clearly indicated in Fig. 11 and needs no further description, since the other parts, in general, operate in substantially the same way as the corresponding parts described in the Carter patent.

It will be observed that by the present arrangement it is possible for the picker to take thermoplastically coated labels from the magazine without activating their coatings until after they have been removed from the magazine, thus avoiding the possibility of transmittal of heat to other labels such as would cause them to stick together. At the same time, the operation of the machine is speeded up since the picker is not required to dwell at the magazine but leaves the magazine instantly after contacting a label, the activation of the coating on the label taking place during the time in which the picker is moving through its necessary cycle in moving the label away from the magazine and into contact with the transfer pad. Furthermore, provision is made to avoid overheating of the transfer pad when the picker fails to take a label.

Instead of the single centrally located port 237 of the picker plate 233, it is contemplated that the plate may have a plurality of ports distributed over the area which is covered by the label during the picking operation, the several ports communicating with the passage 236 so that the blast of compressed air delivered through the passage 237 will act more or less uniformly over the surface of the label in separating or assisting in the separation of the latter from the picker plate.

While the use of an air blast has been suggested as a means for separating the label from the picker plate, it is contemplated that any other and equivalent means, falling within the terms of the appended claims may be employed. Furthermore, while the port or ports in the picker are here specifically described as for the delivery of air under pressure, such port or ports may be made use of in connection with a vacuum pump as a means for operating a latch or equivalent device temporarily to modify the machine cycle in the event that the picker fails to receive a label, in a manner similar to that more fully disclosed in the patent to Sjoberg, No. 2,303,507, dated December 1, 1942.

While one desirable embodiment of the invention has herein been described by way of example it is to be understood that the invention is broadly inclusive of any and all modifications falling within the scope of the appended claims.

I claim:

1. That method of presenting a label at a label-applying point in readiness for its application to an article intended to receive it and wherein the label is coated on one side with an adhesive which is initially non-tacky, said method comprising as steps, contacting the non-tacky coating on the label with a part having thereon a sticky coating of the same material as that on the label to which the coating on the label adheres and, while the coating on the label is non-tacky, initiating movement of said part toward the label-applying position with the label adhering to it, and, after initiation of such movement, and while the label is adherent to said part activating the coating on the label.

2. That method of presenting labels according to claim 1 and wherein the coating on the label is thermoplastic, further characterized in activating the coating by the application of heat while the label is being moved toward the label-applying position.

3. That method of transferring labels, coated on one side with a normally non-tacky thermoplastic, one-by-one, from a stack to a label-applying station, which comprises as steps, directly contacting the coating of the endmost label in the stack with a part having thereon a sticky coating of the same material as that on the label but without activating the coating on the label, moving said part away from the stack of labels and thereby removing said endmost label from the stack, and activating the coating on said label after the latter has been separated from the stack and while the label is moving toward the applying station.

4. That method of transferring labels coated with a normally non-tacky thermoplastic, one-by-one from a stack to a label-applying station which comprises as steps, directly contacting the coating of the endmost label in the stack with a heated part having thereon a sticky coating of the same material as the coating on the label to which the coating on the label adheres, so limiting the time of contact with the label that the coating on the label is not activated before the label is removed from the stack and moving said part with said endmost label adherent thereto through a path of such length that the coating on the label becomes tacky before the label reaches the label-applying station.

5. That method of removing non-tacky, thermoplastically coated labels one-by-one from a stack by means of a heated part which comprises as steps, causing said heated part directly to contact the coating on the endmost label in the stack whereby the label is caused to adhere to said part, initiating movement of said part away from the stack with said label adherent to it before the coating on the label has become tacky, and keeping the coating on the label in contact with said part until it has become tacky.

6. That method of removing normally non-tacky, thermoplastically coated labels one-by-one from a stack which comprises as steps, coating a heated part with adhesive substantially like the adhesive which coats the label, directly contacting the sticky coating on said part for an instant with the coating on the endmost label in the magazine thereby to cause the label to adhere to said part, quickly moving said part away from the magazine before the heat of said part can activate labels remaining in the magazine, and holding the label which adheres to said part in contact with said part until the thermoplastic coating on said label has become tacky.

7. In a labeling machine of the kind in which labels, each having a normally non-tacky coating of adhesive, are stacked in a magazine so that the coating on the endmost label is exposed and wherein an adhesively coated picker takes labels by adhesion one-by-one from the magazine and moves each label along a predetermined path while it adheres to the picker, in combination, means for heating the picker, means for moving the picker toward and from the magazine, said picker-moving means being so constructed and arranged that the picker contacts the exposed coated surface of the end-most label in the magazine for too short a time to activate the coating on said label, and means for stripping the label from the picker only after the coating has become activated by the heat of the picker.

8. In a labeling machine of the kind in which labels each having a normally non-tacky coating of adhesive, are stacked in a magazine with the coating on the endmost label exposed and wherein an adhesively coated picker takes labels by adhesion one-by-one from the magazine and moves each label along a predetermined path while it adheres to the picker, in combination, means for heating the picker, means for moving the picker toward and from the magazine, said picker-moving means being so constructed and arranged that the picker contacts the exposed coated surface of the end-most label in the magazine for an instant only and thereafter holds the picker stationary for a sufficient time so that the label adherent thereto is activated, and means for so removing the label from the picker, after the coating on the label has been activated, as to leave a portion of the label coating on the picker.

9. In a labeling machine of the kind in which labels each having a normally non-tacky coating of adhesive, are stacked in a magazine and wherein an adhesively coated picker takes labels by adhesion one-by-one from the magazine and moves each label along a predetermined path while it adheres to the picker, and wherein the picker dwells at a transfer point while the label is transferred to a pneumatic carriage which moves it to a label-applying station, in combination, means for heating the picker, means for moving the picker into contact with the endmost label in the magazine and for moving it away from the magazine so quickly that the heat of the picker does not activate the coating on the label while the latter is within the magazine, and means for so relatively moving the picker and transfer carriage, after the coating has been activated by the heat of the picker, as to leave the label adhering to the carriage and to leave a portion of the label-coating on the picker.

10. In a labeling machine of the kind in which labels each having a normally non-tacky coating of adhesive, are stacked in a magazine and wherein an adhesively coated picker takes labels by adhesion one-by-one from the magazine and movts each label along a predetermined path while it adheres to the picker, and wherein the picker dwells at a transfer point while the label is transferred to a pneumatic carriage which moves it to a label-applying station, in combination, means for heating the picker, means for moving the picker into contact with the endmost label in the magazine and for moving it away from the magazine with a label adherent thereto but before the coating on the label has been activated by the heat of the picker, the picker having an air delivery port, and means for so relatively moving the picker and transfer carriage that, in separating, a portion of the label-coating is left on the picker; and means for discharging air under pressure through said port thereby to assist in breaking the adhesion between the label and picker.

11. In a labeling machine of the kind in which labels each having a normally non-tacky coating of adhesive, are stacked in a magazine and wherein an adhesively coated picker takes labels by adhesion one-by-one from the magazine and moves each label along a predetermined path while it adheres to the picker, and wherein the picker dwells at a transfer point while the label is transferred to a pneumatic carriage which moves it to a label-applying station, in combination, means for heating the picker, means for moving the picker into contact with the endmost label in the magazine and for moving it away from the magazine instantly thereby to prevent activation of the coating on the label by the heat of the picker while the label remains within the magazine, the picker being carried by a stem having an air passage therethrough, the picker having a port communicating with said passage, means for so separating the picker and transfer carriage as to leave a portion of the label-coating on the picker, and means for delivering air under pressure through said passage and port, as the picker and carriage start to separate, thereby to break the adhesion between the picker and label.

12. In a labeling machine of the kind in which labels each having a normally non-tacky coating of adhesive, are stacked in a magazine and wherein an adhesively coated picked takes labels by adhesion one-by-one from the magazine and moves each label along a predetermined path while it adheres to the picker, and wherein the picker dwells at a transfer point while the label is transferred to a suction pad which moves it to a label-applying station, in combination, means for heating the picker, means for moving the picker into contact with the endmost label in the magazine and for moving the picker away from the magazine so quickly that the heat of the picker does not activate the coating on the label while the latter remains in the magazine, and means for separating the picker and the suction pad by relative movement along a path at right angles to the surface of the picker whereby a portion of the coating of the label remains on the picker.

13. In a labeling machine according to claim 9, means operative to introduce air under pressure between the label and the picker surface, after the label coating has become tacky, thereby to assist in breaking the adhesion between the label and the adhesive coating on the picker as the label is being stripped from the picker.

14. In a labeling machine of the kind having a magazine, a suction pad for moving a label from a transfer station to a label-applying station, a heated adhesive-type picker adapted to take a label from the magazine and to deliver it to the suction pad while the latter dwells at the transfer station and wherein a spring tends to move the picker into contact with the suction pad while the latter dwells at the transfer position and wherein a movable stop element is operative, at times, to prevent the picker from reaching transfer position, in combination, spring means tending to move the stop element to operative position, and pneumatic means, automatically operative, when the picker leaves the magazine with a label adhering thereto, to prevent the operation of the stop element.

15. In a labeling machine of the kind having a magazine, a suction pad for moving a label from a transfer station to a label-applying station, a heated adhesive-type picker adapted to take a label from the magazine and to deliver it to the suction pad while the latter dwells at the transfer station, and wherein a spring tends to move the picker into contact with the transfer pad while the latter dwells at the transfer position and wherein a movable stop element is operative, at times, to prevent the picker from reaching transfer position, in combination, spring means tending to move the stop element to operative position, means moving in time with the operation of the picker for holding the stop element out of operative position during that part of the cycle in which the picker is approaching the magazine, and pneumatic means, responsive to the presence of a label in contact with the picker, operative to hold the stop element out of operative position while the picker is carrying a label from the magazine to the transfer position.

16. In a labeling machine of the kind having a magazine, a carriage having a suction pad for moving a label from a transfer station to a label-applying station, a heated adhesive-type picker adapted to take a label from the magazine and to deliver it to the suction pad while the carriage dwells at the transfer station, and wherein a spring tends to move the picker into contact with the carriage while the latter dwells at the transfer position and wherein a movable stop element is operative, at times, to prevent the picker from reaching transfer position, in combination, spring means tending to move the stop element to operative position, a pneumatic motor for holding the stop element out of operative position, the picker having a suction port in its label contacting face and means operative to establish suction at the pressure motor if, when the picker leaves the magazine, the suction port is closed by a label adherent to the picker, thereby keeping the stop element inactive and permitting the picker to reach the transfer position.

17. In a labeling machine of the kind having a magazine, a suction pad for moving a label from a transfer station to a label-applying station, a heated adhesive-type picker adapted to take a label from the magazine and to deliver it to the suction pad while the latter dwells at the transfer station, and wherein a spring tends to move the picker into contact with the suction pad while the latter dwells at the transfer position and wherein a movable stop element is operative at times to prevent the picker from reaching the transfer position, in combination, spring means tending to move the stop element to operative position, a pneumatic motor responsive to subatmospheric pressure to keep the stop element inactive, a part, which moves in time with the picker, operative to keep the stop element inactive while the picker is approaching the magazine, the picker having a suction port in its label-contacting face, a vacuum pump, conduits leading from the pump intake to the suction port in the picker and to the pressure motor respectively, and means for so actuating the pump that it tends to establish subatmospheric pressure at the pneumatic motor as the picker leaves the magazine.

18. In combination in a labeling machine of the kind wherein a rotating shaft, through the intermediary of appropriate mechanism, causes a movable adhesive type picker to take a label from a magazine and carry it to a transfer position where it is received by a movable carrier, a movable stop element operative, at times, to prevent the picker from reaching the transfer position although the shaft continues to turn, means tending to move the stop element to its operative position, a motor for moving the stop element away from its operative position, and means operative to energize the motor whenever the picker moves away from the magazine with a label adhering to its surface.

19. In combination in a labeling machine of the kind wherein a rotating shaft, through the intermediary of appropriate mechanism, causes a movable adhesive type picker to take a label from a magazine and carry it to a transfer position where it is received by a movable carrier, a movable stop element operative, at times, to prevent the picker from reaching the transfer position although the shaft continues to turn, means tending to move the stop element to its operative position, a motor for moving the stop element away from its operative position, a cam turning in time with the shaft, a part which is actuated by the cam to hold said stop element out of its operative position while the picker is approaching the magazine, and means operative to prevent energization of the motor if the picker moves away from the magazine without taking a label.

20. In combination in a labeling machine wherein a magazine holds a stack of labels, each having a normally non-tacky coating of thermoplastic adhesive with the coating of the endmost label in the magazine exposed, a picker movable toward and from the magazine, the picker having a sticky coating operative by contact with the coating on the endmost label in the magazine to cause said label to cling to the picker while the thermoplastic coating on the label remains non-tacky, means for moving the picker to and from the magazine, and means for activating the coating on the label after the picker has withdrawn the label from the magazine.

21. In combination in a labeling machine, a magazine for labels each having a normally non-tacky coating of thermoplastic adhesive, a picker movable toward and from the magazine, the picker being heated and having thereon a sticky coating of the same thermoplastic which coats the labels, means for moving the picker to contact its sticky coating with the coated surface of the endmost label in the magazine and to retract the picker from the magazine before the coating on the label has become activated by the heat of the picker, and means whereby the sticky coating on the picker is renewed at the beginning of each cycle of operation.

22. In a labeling machine of the kind wherein an adhesively coated picker takes labels one-by-one from a magazine and moves each label to a transfer point where the label is engaged by a pneumatic suction pad and held by the latter while the picker and pad are separated, means for separating the pad and picker by relative movement along a path perpendicular to the label-contacting surface of the picker, and means for delivering air under pressure between the label and picker thereby to assist in breaking the adhesive bond between the label and picker.

23. In a labeling machine of the kind wherein a heated adhesive type picker by direct contact with the coated surface of a label takes thermoplastically coated labels one-by-one from a magazine in which the labels are so stacked that the coating on the endmost label is exposed and moves each label to a transfer point where it is engaged by a pneumatic transfer pad and held by the latter while the picker and pad are separated, means for separating the picker and pad, and means for circulating cooling air through the picker to avoid overheating.

24. In combination, in a labeling machine of the kind in which a heated adhesive-type picker takes thermoplastically coated labels from a magazine and carries them to a transfer point where the picker dwells while the label is received by a suction type carrier, and wherein a picker actuating lever is urged to carry the picker toward the transfer point by a spring and is moved in the opposite direction by power driven means, and wherein the picker actuating lever has an abutment element, a shaft parallel to the pivotal axis of said lever, a latch pivoted to swing about the axis of said shaft and whose free end is so arranged as at times to engage said abutment element and thereby prevent the picker from reaching the transfer point, a bell crank lever arranged to swing about the axis of said shaft, one arm of said lever carrying the casing of a pressure motor, means for adjusting the position of the other arm of said bell crank lever, the pressure motor comprising a pressure responsive element carrying a hook which engages the latch, means for establishing a pressure condition in the casing of the pressure motor, such as to hold the latch out of the path of the abutment during a predetermined portion of the cycle of operation of the machine, means operative to prevent the establishment of such pressure condition if the picker approaches the transfer point without a label, and means operative under the latter condition to swing the latch into engagement with the abutment.

References Cited in the file of this patent

UNITED STATES PATENTS

| | | |
|---|---|---|
| 2,247,623 | Von Hofe | July 1, 1941 |
| 2,279,724 | Von Hofe | Apr. 14, 1942 |
| 2,339,055 | Craig | Jan. 11, 1944 |
| 2,521,827 | Carter | Sept. 12, 1950 |
| 2,528,944 | Carter | Nov. 7, 1950 |
| 2,565,975 | Lissimore | Aug. 28, 1951 |
| 2,600,205 | Carter | June 10, 1952 |